Aug. 14, 1923.						1,464,547
S. STEINMETZ
APPARATUS FOR WASHING, HUSKING, AND POLISHING WET GRAIN
Filed Aug. 20, 1921				2 Sheets-Sheet 1

Inventor:
Stefan Steinmetz.
By
B. Singer. Atty.

Aug. 14, 1923.
S. STEINMETZ
1,464,547
APPARATUS FOR WASHING, HUSKING, AND POLISHING WET GRAIN
Filed Aug. 20, 1921    2 Sheets-Sheet 2
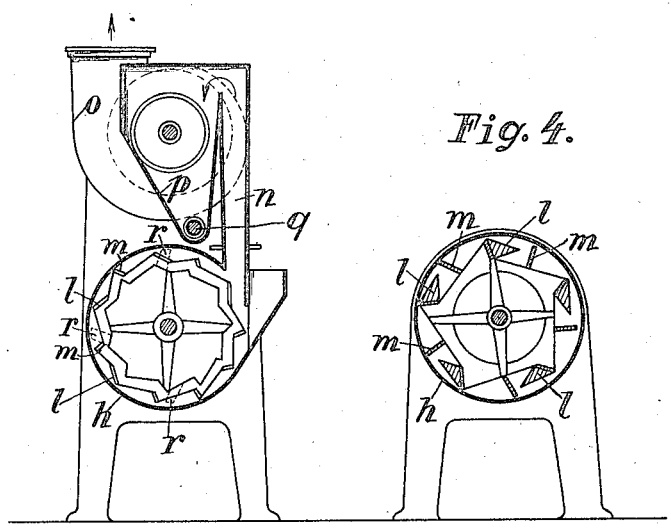
Inventor:
Stefan Steinmetz.
By B. Singer Atty Patented Aug. 14, 1923.

1,464,547

UNITED STATES PATENT OFFICE.

STEFAN STEINMETZ, OF BERLIN, GERMANY.

APPARATUS FOR WASHING, HUSKING, AND POLISHING WET GRAIN.

Application filed August 20, 1921. Serial No. 493,897.

*To all whom it may concern:*

Be it known that I, STEFAN STEINMETZ, a citizen of the German Republic, and a resident of Berlin, Germany, have invented certain new and useful Improvements in Apparatus for Washing, Husking, and Polishing Wet Grain (for which I have filed an application in Germany on Jan. 24, 1916), of which the following is a specification.

For husking wet grain in one series of operations, hitherto numerous and complicated machine-elements have had to be depended upon because the water is simultaneously removed, lubrication of the grains is hindered, and finally the husked grains must be converted into the dry condition.

According to the present invention a simple method of attaining the desired end is disclosed. Devices which have hitherto been employed separately are now employed, so to speak, grafted into one another, whereby the grain is made sufficiently wet but not too wet, and on the other hand lubrication of the grains and of entire mechanical plant are effectively provided for and the grain can pass through the series of operations very much more quickly.

This invention will be more fully described with reference to the drawing, which shows a suitable apparatus by way of example. In the drawing—

Fig. 3 is a vertical section on the line X—X in Fig. 2 and

Fig. 4 is a sectional view of a modified form of husking drum which may be employed and Fig. 5 shows a modified form of construction of the upper part of the device illustrated in Fig. 1.

Figure 1:
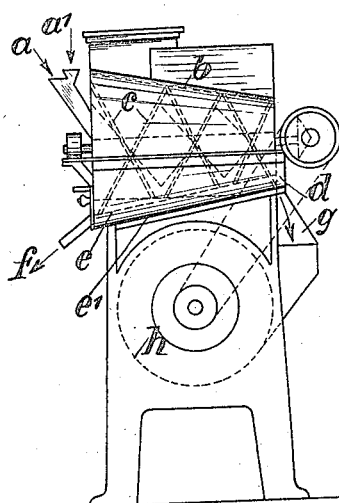
Figs. 1 and 2 show diagrammatically a side and a longitudinal elevation respectively of the entire husking apparatus (the latter elevation being partly in section).
Figure 2:
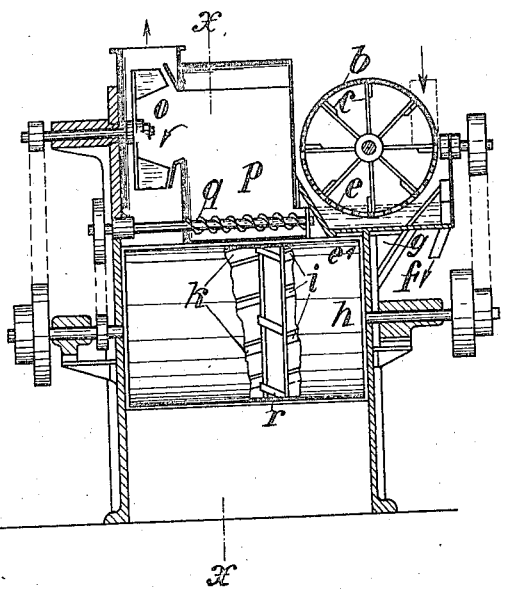
Figure 5:
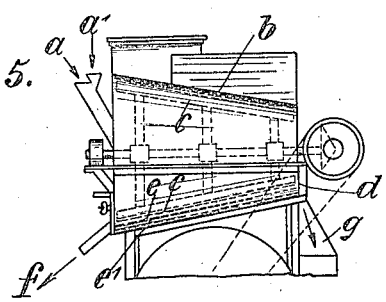

To make clear the invention it will suffice to explain the apparatus in conjunction with its mode of operation.

The grain, mixed with water in any suitable manner (possibly by the admission of water at $a^1$) passes from $a$ into a conical, stationary drum $b$, the larger end of which is on the admission side, and within which a screw-like beating member $c$ rotates. The threads of this beater extend parallel to the wall of the drum and therefore taper towards the outlet $d$ correspondingly to the conical form.

Water is flung through the strainer bottom $e$ into the trough $e^1$ below it, the just described arrangement of conical housing preventing free water being carried on with the grain. At $f$ is indicated an outlet for the water which collects in the trough $e^1$. At the same time this arrangement allows water to accumulate in the drum until about the height of the enclosed outlet duct $f$. Out of the drum the first portion of the beater, i. e., that of the largest diameter, can then always draw fresh water, this being specially of advantage in the treatment of hard grain in order to be able to wash the same very effectively and to moisten it well.

As however there is no danger of free water reaching the outlet $g$, uniform moistening of the grain is provided for, which is necessary in order to permit full saturation of the husks with water so that in the following stages of the process they can be the more easily released from their cores.

The husking drum $h$, which remains continuously in communication with the upper wash-drum $b$ by way of the outlet passage $g$ has, running within it, the blade-system $i$, and the adjoining polishing drum a similar blade-system $k$ to which systems is allotted in a novel manner the double duty of accelerating with very great efficiency the removal of the husk from, and subsequent polishing of the grains. The drum $h$ which may be cylindrical, consists, both at its entire periphery and throughout its entire length, of a closed sheet of metal, from which no water can escape. The blade-systems $i$ and $k$ are composed of two elements which, mainly owing to their different positions relatively to the rotary axis, have different duties. These two elements are the surfaces $l$ and $m$ which preferably follow one another alternately. The flatter blade surfaces $l$ serve to press the grains against the drum $h$ and the steeper surfaces $m$ effect a rapid removal of the moistened grain, of which removal the pressure surfaces $l$ are insufficiently capable owing to their positioning being more favorable for exerting pressure.

The blade systems $i$ and $k$, though separated from each other, may be similarly constituted as above described, one system $i$ serving purely as husking means and the other $k$ as rehusking or polishing means. Fig. 4 shows a modification of a husking or polishing roller.

In order to render the transference of the husked grain from the husking drum $i$ to the polishing drum $k$ uniform, it is convenient to arrange between the two drums a distributing blade system $r$ for accelerating the entry into the second drum, so that the mixture of still moistened grain and loose husks has no opportunity to be deposited on the bottom of the drum $k$.

While the work of peeling and polishing is accomplished by the blade systems $i$ and $k$, an air current passes through the channel $n$ and into the suction vent $o$, which carries away the shells detached from the grain by means of the pressure surface $l$ and the friction between the grain. The larger shells and the eventual grain which is carried away, accumulates in the chamber $p$ and is carried away therefrom by a worm $q$. The shell dust is guided from the suction vent $o$ in the direction of the arrow to a dust chamber, not shown in the drawing, while the grain free from shells is discharged at the end of the drum $h$.

In consequence of the above described combination of various elements, known per se, for moistening, husking, polishing and finally drying the grain in a comparatively very small space, possibility being however afforded to set up the various machine elements separately, the cores of the grains can absorb no moisture, which is very advantageous when it is considered that thereby the grinding apparatus may be directly connected to the machine.

Having now particularly described my invention, what I claim as new and desire to secure by Letters Patent of the United States is:

1. A device for washing, husking, and polishing grain comprising, in combination, a conical wash drum having perforations in its lower half; means adapted to drive the grain towards the small end of said drum; beating members arranged in the wash drum; a trough arranged below said drum, an outlet passage in said wash drum; another drum so arranged with respect to the wash drum as to allow the wet grain passing directly from said latter drum into said other drum by means of said outlet passage; and beaters arranged in the said other drum and having two sets of operating members, the members of the one set standing more radially than tangentially, those of the other set lying more tangentially than radially, with respect to the circumference of the said other drum.

2. A device for washing, husking, and polishing grain in a continuous course of work, comprising, in combination, a conical wash drum having sieve-like perforations in its lower half; means adapted to drive the grain towards the small end of said drum; rotary beating members arranged in the wash drum; a trough arranged below said drum, an outlet passage in said wash drum; another drum so arranged with respect to the wash drum as to allow of the wet grain passing directly from said latter drum into said other drum by means of said outlet passage; beaters arranged in the said other drum and having two sets of operating members; the members of the one set standing more radially than tangentially, those of the other set lying more tangentially than radially, with respect to the circumference of the said other drum; and means for rotating the beaters of both drums.

3. A device for washing, husking, and polishing grain in a continuous course of work, comprising, in combination, a conical wash drum having sieve-like perforations in its lower half; means adapted to drive the grain towards the small end of said drum; rotary beating members arranged in the wash drum; a trough arranged below said drum, an outlet passage in said wash drum; another drum so arranged with respect to the wash drum as to allow the wet grain passing directly from said latter drum into said other drum by means of said outlet passage; two beater systems arranged in the said other drum; and a blade system also arranged in this drum and located between said two beater systems.

4. A device for washing, husking, and polishing grain comprising, in combination, a conical wash drum having perforations in its lower half; means adapted to drive the grain towards the small end of said drum; beating members arranged in the wash drum; a trough arranged below this drum; another drum arranged below the wash drum at right angles to it; a grain conducting connection between the two drums; two beater systems arranged in said other drum and having each two sets of operating members, the members of the one set standing more radially than tangentially; those of the other set lying more tangentially than radially, with respect to the circumference of the said other drum; a blade system also arranged in said drum and located between said two beater systems; and means for transmitting motion from the shaft of the second drum to the shaft of the first.

In testimony whereof I affix my signature in presence of two witnesses.

STEFAN STEINMETZ.

Witnesses:
OTTO F. BRUNN,
PAUL BRABAND.